US006571351B1

(12) United States Patent
Mitaru et al.

(10) Patent No.: US 6,571,351 B1
(45) Date of Patent: May 27, 2003

(54) TIGHTLY COUPLED SECONDARY STORAGE SYSTEM AND FILE SYSTEM

(75) Inventors: Alexandru Mitaru, Beaverton, OR (US); Richard W. Stallkamp, Tigard, OR (US); Michael Powell, Sherwood, OR (US)

(73) Assignee: Omneon Video Networks, Sunnyvale, CA (US)

( * ) Notice: Subject to any disclaimer, the term of this patent is extended or adjusted under 35 U.S.C. 154(b) by 0 days.

(21) Appl. No.: 09/544,946

(22) Filed: Apr. 7, 2000

(51) Int. Cl.[7] ............................. G06F 11/00; H04L 1/22
(52) U.S. Cl. ............................................ 714/6; 711/163
(58) Field of Search .............................. 714/6, 5, 7, 13, 714/20, 27, 43, 56, 8, 42; 711/114, 133, 163

(56) References Cited

U.S. PATENT DOCUMENTS 5,835,940 A  11/1998  Yorimitsu et al.

FOREIGN PATENT DOCUMENTS

| EP | 0485110 A2 | 5/1992 |
| EP | 0584804 A2 | 3/1994 |
| EP | 0701198 A1 | 3/1996 |
| EP | 0768606 A2 | 4/1997 |
| EP | 0801344 A2 | 10/1997 |
| WO | WO91/13404 | 9/1991 |
| WO | WO97/07461 A | 2/1997 |

OTHER PUBLICATIONS

"RAID High Performance, Reliable Secondary Storage", P.M. Chen et al, ACM Computing Serveys 26:2 (Jun., 1994) pp 145–185.
"A Case for Redundant Arrays of Inexpensive Disks (RAID)", David A. Patterson et al., Tech. Rep. UCB/CSD 87/391 (1987), Univ. of Calif.

Primary Examiner—Nadeem Iqbal
(74) Attorney, Agent, or Firm—Blakely, Sokoloff, Taylor & Zafman, LLP (57) ABSTRACT

A fault tolerant, secondary storage engine (such as a RAID engine) is closely coupled with a file system to achieve greater overall throughput in storage/database applications having a mix of large, sequential access transactions and small, random access transactions. In addition, disk rebuild time may be greatly reduced using such an embodiment. A logical storage space representing a storage area in a set of non-volatile storage devices is divided into nonoverlapping storage allocation units (SAUs) such as stripes, each SAU to overlay all of the devices in the set. Different fault tolerant storage methodologies (FTSMs) are assigned to access (i.e. read/write) data in the different SAUs, respectively. An access is made to an SAU in the set responsive to an input storage request of a first or second type, respectively.

17 Claims, 8 Drawing Sheets

Fig. 1

Fig. 2 Logical Allocation Table

| SAU | USED/FREE | FTSM type |
|---|---|---|
| Stripe 0 | 1 | Level III RAID |
| Stripe 1 | 1 | Level III RAID |
| Stripe 2 | 1 | Level III RAID |
| Stripe 3 | 1 | Level I RAID |
| Stripe 4 | 0 | — |

Fig. 3 Stripe Allocation Bitmap

Fig. 4 Small Stripe BitMap (for one large stripe)

Fig. 5 Small Block BitMap (for one large stripe)

TIGHTLY COUPLED SECONDARY STORAGE SYSTEM AND FILE SYSTEM

FIELD OF THE INVENTION

This invention is related to non-volatile, mass electronic storage systems, also known as secondary storage systems.

BACKGROUND INFORMATION

Secondary storage systems are widely used with different types of client applications including on-line transaction processing and multimedia storage. Transaction processing includes for instance credit card processing which is characterized by the client requesting a relatively large number of small data transactions. In contrast, multimedia storage such as video and music file access generally requires significantly larger transactions. In a typical operation, the client application sends a high level request for reading or writing a file to a file system. The file system maintains a file system name space, and maps file reads/writes to lower level block accesses. These block accesses are then fed to a storage engine that is typically part of a secondary storage system that includes a rotating magnetic disk drive. The storage engine typically has no knowledge of whether the file system is using a particular block in the disk drive, and as such can be described as being independent of the file system.

A currently popular technique for implementing a high performance, large capacity, and low cost secondary storage system is the Redundant Array of Inexpensive Disks (RAID). In a RAID, a set of rotating magnetic disk drives (referred to here as simply "disks") are organized into a single, large, logical disk. Each disk in the set typically has the same number of platters and the same number of tracks on each platter where the data is actually stored. The data is "striped" across multiple disks to improve read/write speeds, and redundant information is stored on the disks to improve the availability of data (reliability) in the event of catastrophic disk failures. The RAID secondary storage system can typically rebuild the failed data disk, without involving the file system, by regenerating each bit of data in each track and platter of the failed disk (using its knowledge of the redundant information), and then storing each such bit in corresponding locations of a new, replacement disk.

Several RAID architectures (known in the industry as "levels") have been developed to provide various combinations of cost, performance, and reliability. For instance, in a Level I RAID, a block of data received from the file system by an input/output (I/O) controller of the RAID is stored entirely in one disk and replicated in a check disk. Level I thus uses twice as many disks as a nonredundant disk array, but provides speedy access (either disk by itself may be used to retrieve the block) and high availability. Accordingly, Level I is frequently used with applications such as on-line transaction processing where availability and transaction rate are more important than storage capacity efficiency.

In contrast, in a Level III RAID architecture, the block of data is spread bit-wise over a number of data disks, and a single parity disk is added to tolerate any single disk failure. The use of parity rather than a replicate of the data lowers the availability in comparison with a Level I architecture. However, storage efficiency is greatly improved as only one parity disk is used for several data disks. Thus, Level III may particularly suit applications that require the storage of large amounts of data and high throughput where data is accessed sequentially most of the time, as in digital video file storage.

There are two problems with the above described RAID architectures. First, as the storage capability of the typical disk drive steadily increases, disk rebuild times also increase. Since, while rebuilding a failed disk, the storage system is unprotected, i.e. a second disk failure implies the total failure of storage system, longer rebuild times can become a serious problem. This problem becomes even greater as the likelihood of failure increases with larger RAID sets having greater numbers of disk drives.

Another problem is reduced read/write performance with applications such as television production, where large transactions involving requests to retrieve or store media files, such as television program and commercial files, are combined with smaller transactions that access text files or "metadata" files which describe the commercial or program contained in a particular media file. Although RAID Level I provides speedy access for both large and small transactions, duplicating the large media files makes inefficient use of the total storage space as compared to that which can be obtained using Level III. Performance using RAID Level III, however, suffers for small, randomly addressed transactions due to the need to access the data in a random fashion over several disks rather than just one.

SUMMARY

An embodiment of the invention described below benefits from the concept of closely coupling a fault tolerant, mass storage engine (such as a RAID engine) with a file system to achieve greater overall throughput in storage/database applications having a mix of large, sequential access transactions and small, random access transactions. In addition, disk rebuild time may be greatly reduced using such an embodiment.

A method according an embodiment of the invention includes dividing a logical storage space representing a storage area in a set of non-volatile storage devices into nonoverlapping storage allocation units (SAUs), each SAU to overlay all devices in the set. Different fault tolerant storage methodologies (FTSMs) are assigned to access (i.e. read/write) data in the different SAUs, respectively. Access to the data is done based on the particular FTSM for the SAU that is being accessed.

In a particular embodiment, an allocation table can be shared by both the file system and the RAID engine by virtue of the table being made public to the RAID engine. This allows the file system to chose the optimal fault tolerant storage methodology for storing a particular data stream or data access pattern, while simultaneously allowing the RAID engine to properly recover the data should a disk fail (by referring to the allocation table to determine which fault tolerant storage methodology was used to store the file.) Also, when the RAID engine rebuilds a failed disk, only the SAUs that are indicated in the allocation table as being used by the file system are rebuilt, thus saving rebuild time which is particularly advantageous when large capacity individual disk drives are being used.

BRIEF DESCRIPTION OF THE DRAWINGS

The invention is illustrated by way of example and not by way of limitation in the figures of the accompanying drawings in which like references indicate similar elements. It should be noted that references to "an" embodiment in this disclosure are not necessarily to the same embodiment, and they mean at least one.

FIG. 11 illustrates a block diagram of a video network featuring an embodiment of the invention.

DETAILED DESCRIPTION

File System Storage Allocation

Figure 1:
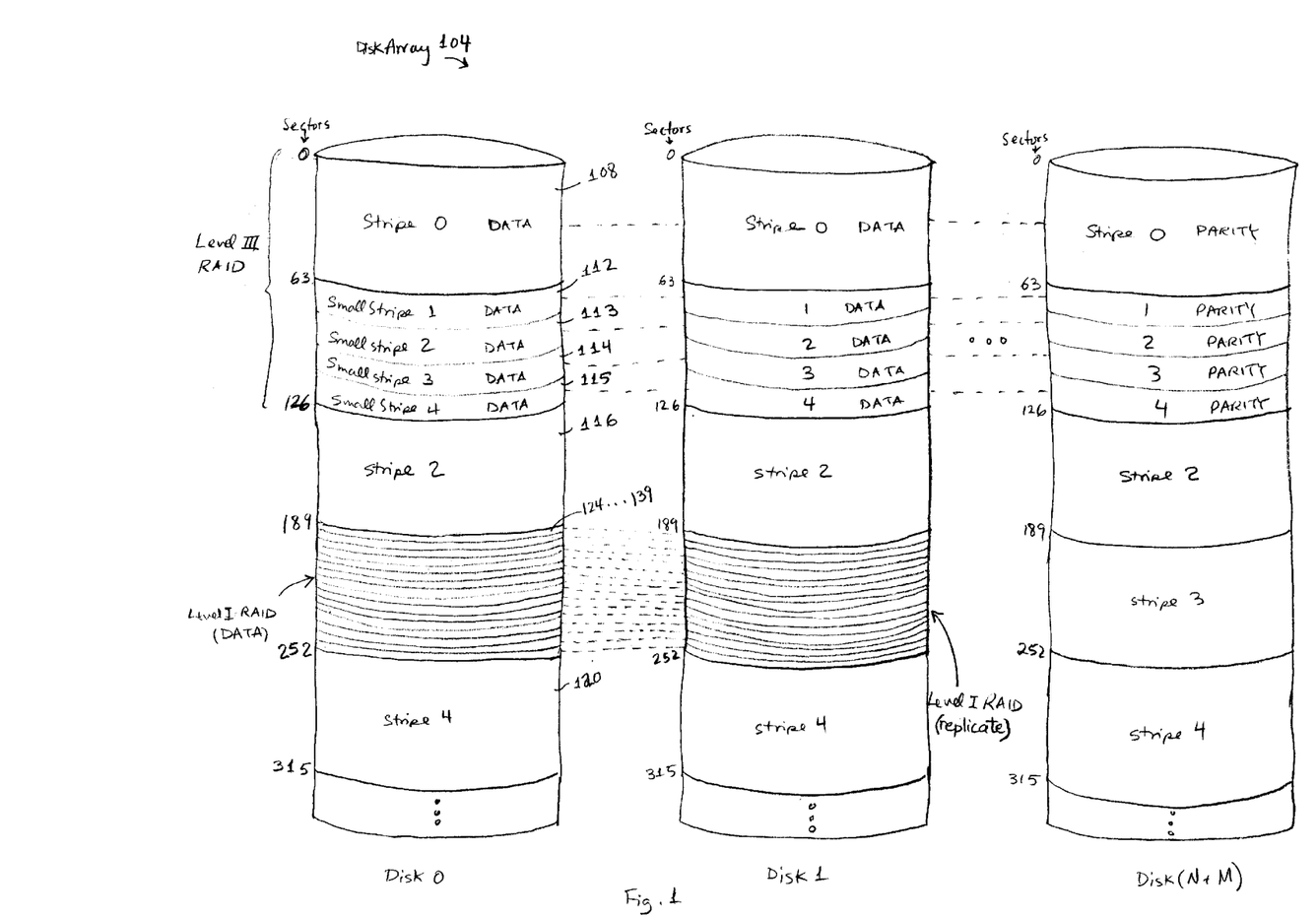
FIG. 1 shows the allocation of storage space in a disk array, according to an embodiment of the invention.

Referring to FIG. 1, an allocation of storage space in a disk array 104 is disclosed. There are generally N data disks and M check disks in the array, where a raidSet denotes a group of N+M disks to which a number of FTSMs are applied to obtain fault tolerant data storage therein. The basic storage allocation unit (SAU) of disk space that can be defined by the file system is called a stripe 108. The logical storage space of a raidSet may be divided into any number of nonoverlapping stripes 108, 116, and 120 as shown in FIG. 1. Each stripe overlays the same two or more of the same disks in the set, such that each stripe may be a number of sectors on each disk in the raidSet and must have the same starting sector number and the same size on each disk. In the particular implementation shown in FIG. 1, stripe 0 consists of sector 0 through sector 63 on disk 0, sector 0 through sector 63 on disk 1, etc. The raidSet may thus be viewed as being sliced into equal stripes. However, the equal sizes are not necessary as a range of different stripe widths may alternatively be allocated. The size (width) of the stripe 108 may be selected to obtain a reasonably high throughput from a disk without incurring excessively high buffer memory penalties. For instance, if the disk sector is 4 kbytes, then the stripe size per disk is 256 kbytes, and transfers to the disk of this size may achieve a throughput that is reasonably close to the maximum throughput of the disk.

Each file may be allocated an integer number of stripes. The last allocated stripe, however, might be partially filled, so that there is some space wasted per file that on the average will be equal to half the size of the stripe. In the case of a raidSet having 8 data disks and 1 check (redundancy) disk, the data portion of the raidSet stripe is 8*256 kbytes=2 Mbytes, so the wasted space is on average 1 Mbyte. Using this stripe to store compressed video files that are in general hundreds of Mbytes to several Gbytes ensures that wasted space is well under 1% of the size of the file. However, when storing other types of media file types such as audio or highly compressed video, this stripe size may be too large, in terms of wasted space and in terms of buffer memory requirements.

To accommodate smaller media files such as audio and highly compressed video, the stripe may further be divided into a number of smaller SAUs, such as small stripes 112–115. A small stripe has the same topology as a stripe 108, i.e. it covers all data and check disks, but it is only a fraction of the size of the stripe. Thus, for the particular implementation where the stripe is divided into four small stripes as shown in FIG. 1, small stripe 1 will cover sectors 0 to 15 on disk 0, sectors 0 to 15 on disk 1, etc. This allows an access unit of 64 kbytes per disk, achieving a reasonably high throughput (though less than that obtained using the stripe access unit), while cutting the wasted space per file by a factor of four and also minimizing the random access memory (RAM) buffer requirements.

The file system also supports non-media files that are either metadata files that describe the media files, or text files. These files tend to be significantly smaller than media files. In addition, while access to the media files tends to be sequential in general, i.e. a long sequence of writes to record the file and a long sequence of reads to play it, random access to non-media files is more common. The stripe or the small stripe SAU may not be suitable to store these files, because the wasted space may be too large and random access of such SAUs too taxing of throughput. Accordingly, for small files, a third type of SAU called a small block 125 may be defined by dividing the stripe into many small blocks of several sectors each. In the embodiment of FIG. 1, there are 16 small blocks 124 . . . 139 in stripe 3 where each small block is 4 sectors (16 kbytes). The small block 125 is the SAU for data in small files and for all file system metadata information, i.e. the pointer blocks, file table and allocation table data.

To summarize, three types of SAUs have been described, each suited for a particular file type and access pattern: the stripe used to store large media files, the small stripe used for audio or high compression rate media files, and the small block used to store small text files and file system metadata. A fewer or greater number of different types of SAUs may be defined by the file system to suit particular client applications. As will be described below, different FTSMs are assigned to access data in the different allocation units, thus helping make more efficient use of the storage space available in the disk array and improve performance for both large and small transactions requested by the client application.

Assignment of Fault Tolerant Storage Methodologies

The FTSMs create redundancy so that in case of a disk failure all data can be retrieved and the failed disk can be rebuilt after it is replaced with a new one. In a particular embodiment of the invention, the stripe and the small stripe are assigned a modified version of RAID Level 3 as their FTSM. For write requests, the file system accumulates enough data before writing a complete stripe across all data disks. When all stripe data is available, the RAID engine generates an XOR operation across the per-disk portions of stripe data in accordance with Level III RAID. In the case of a large stripe, the XOR function is performed across N (N being the number of data disks) portions of 256 kbytes of data, generating a new portion of 256 kbytes which constitutes the parity data. The parity data is then written to the single (M=1) check disk. In the case of a file read, the RAID engine reads a complete stripe, including the check disk; if a disk has failed, the missing data can be reconstituted and returned to the client by executing the XOR function across the N–1 per-disk portions of stripe data and the portions of parity data in the check disk, in accordance with Level III RAID. The same FTSM (here, Level III RAID) is used when the disk is to be rebuilt: the N–1 disks and the check disk are read, XOR is performed to reconstitute the missing data, and the data is written onto the replacement disk. This algorithm works very well for relatively large files that are accessed sequentially, because the bandwidth "wasted" by the check disk is only 1/N of the raidSet bandwidth, so very high throughputs can be achieved.

The FTSM for small blocks in this embodiment uses a Level I RAID algorithm which simply replicates the data block on a check disk. If a small block of 16 kbytes is written on disk 0, the same data is also written on disk 1 (see FIG. 1). This algorithm is relatively wasteful of disk space (it uses twice the disk space for a given amount of data). However it allows very fast accesses of small files and repeated random accesses.

The Storage Space Allocator Layer

Figure 2:
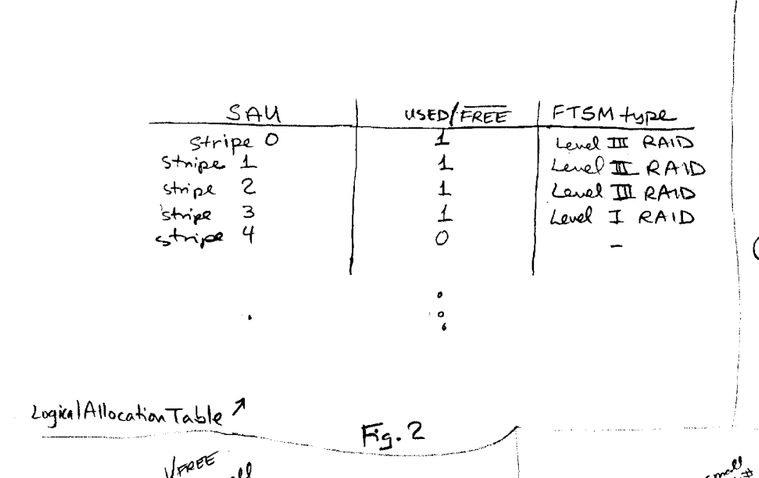
FIG. 2 illustrates a logical allocation table.
Figure 3:
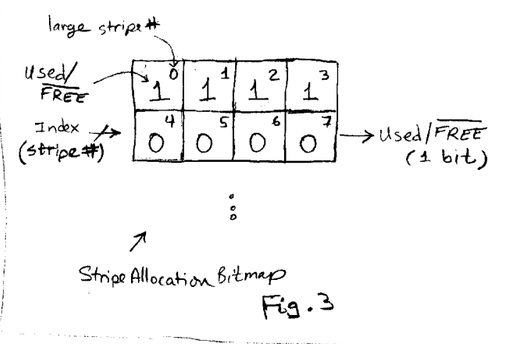
FIG. 3 depicts a stripe allocation bitmap.

The file system's storage space allocator layer has a logical allocation table as shown in FIG. 2 to track the allocation of storage space and FTSM assignment for any stripe. Each stripe is identified and marked as being used, i.e. contains valid data, or free, and the type of FTSM assigned to it. In the particular embodiment of FIG. 3, a bit-map tracks the allocation of stripes: if the bit is set, the stripe is allocated, i.e. some application or subsystem is using it. Access into this bit-map is fast since the stripe number is the index into the bit-map. Several stripes may be needed to store the data in a single file.

Figure 4:
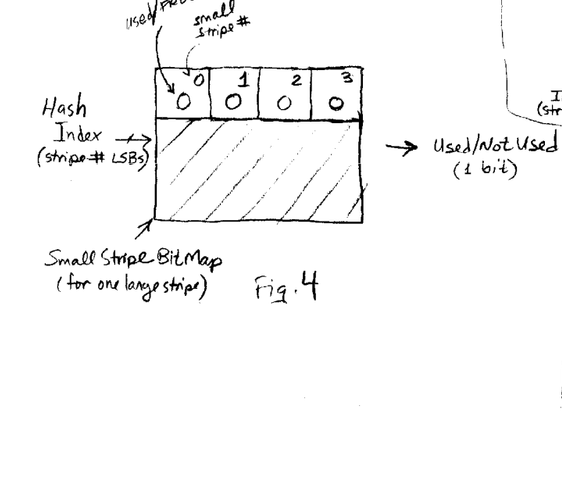
FIG. 4 shows an allocation bitmap for four small stripes.
Figure 5:
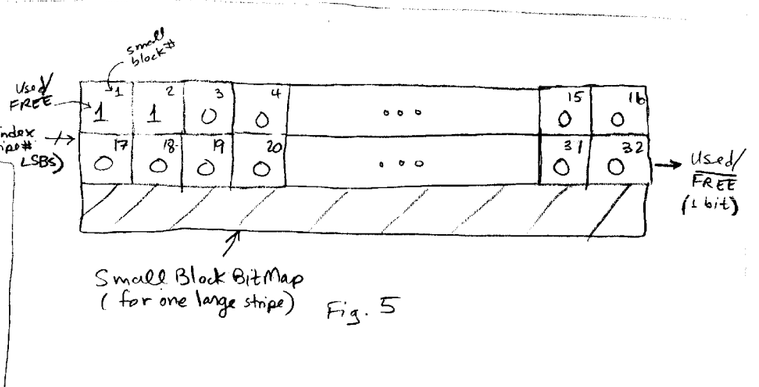
FIG. 5 illustrates an allocation bitmap for 32 small blocks.

When the file system needs to allocate a small stripe (e.g. for smaller media files), it first allocates a stripe, and then divides the stripe into a number (e.g. four) small stripes and allocates a small stripe. Tracking of the small stripe allocation is done with a separate table such as the bitmap shown in FIG. 4. This may be organized as a hash table (the hashing is performed on the low order bits of the stripe number). An entry exists into this table only as long as a stripe is partially allocated as small stripes. When all four small stripes are allocated, the entry is deleted. When all four small stripes are freed, the corresponding stripe is marked not used in the stripe allocation bit map (see FIG. 3). A similar technique may be used to keep track of small blocks. When a small block is needed, a stripe is allocated and divided into a number of small blocks as shown in the bitmap of FIG. 5. An entry is created into a hash table to track the allocation of these small blocks. The table holds the entry only while the stripe is partially allocated as small blocks.

Note that the file system need not predefine or fix how much of the total disk space may be used as stripes or small stripes or small blocks. The allocation is dynamic, where the different allocation types are pulled from the base SAU, the stripe, and when freed they turn back into stripes.

Figure 6:
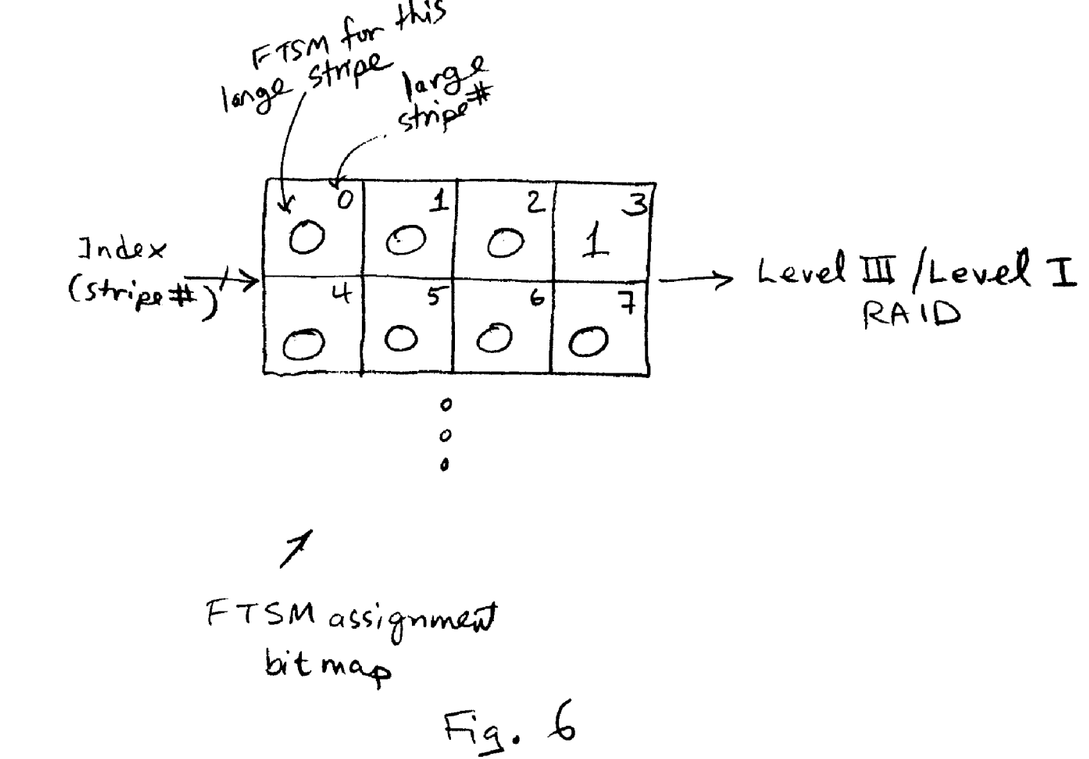
FIG. 6 depicts a FTSM assignment bitmap.

In a particular embodiment of the invention, the assignment of a FTSM for any SAU is performed using a second bit-map that receives its index in parallel with the stripe allocation bit-map of FIG. 2. This is shown in FIG. 6 where the bit-map defines the redundancy algorithm applied to any large stripe. In a particular implementation shown, only two different redundancy algorithms are used, such that a single bit entry is sufficient to distinguish between algorithms. A bit equal to zero means that the corresponding SAU (e.g. stripe) uses the Level III RAID redundancy algorithm; if the bit is one, the data is stored in the SAU using a Level I RAID algorithm—meaning that the stripe has been turned into small blocks, where each small block that is written to a data disk by the RAID engine is replicated to a check disk. Implementations that use more than two redundancy algorithms are possible and can use either multiple bit-maps or multiple bits per entry in the FTSM bit-map of FIG. 6.

The SAU allocation bit-map and the FTSM assignment bit-map are shared between the file system and the RAID engine. The benefits of this approach include:

The file system can chose the FTSM for a specific data stream and/or data access pattern being received from the client. The RAID engine having access to the FTSM assignment bit-map in the storage space allocator layer of the file system can correctly rebuild the SAUs.

When the RAID engine must rebuild a failed disk, it has to rebuild only the SAUs that are marked as being used by the file system; the unused SAUs don't need to be rebuilt. This makes the rebuild time significantly lower if the file system is not full and the disks have relatively large storage capacities.

Having described the structure of the storage system used to achieve high throughput with applications that have a mix of small and large storage transactions, several methods for servicing the transactions are now described.

Servicing Client Requests

Figure 7:
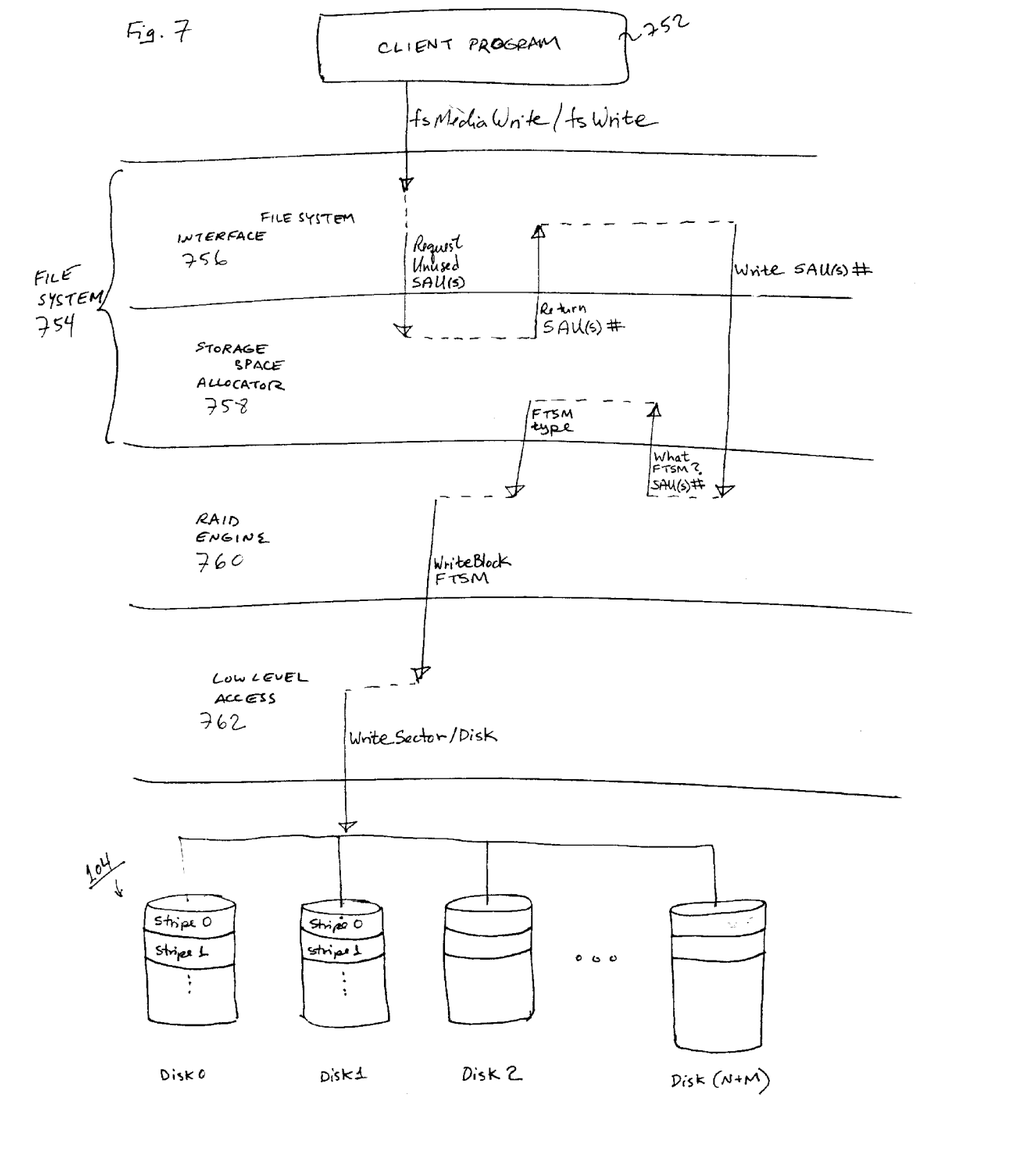
FIG. 7 shows how write requests are handled by a layered architecture that may be used for implementing an embodiment of the invention.
Figure 8:
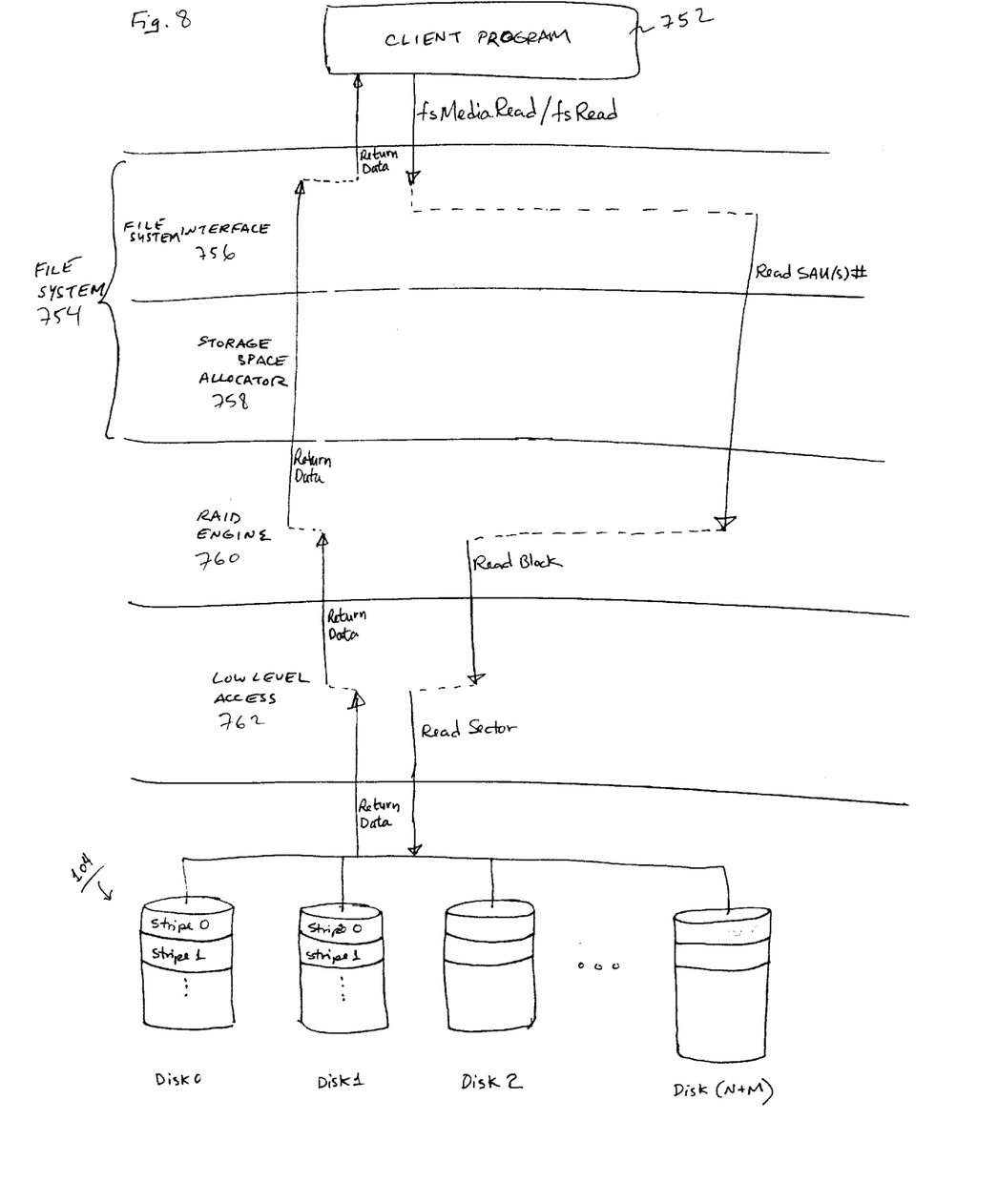
FIG. 8 illustrates how read requests are handled in an embodiment of the invention.
Figure 9:
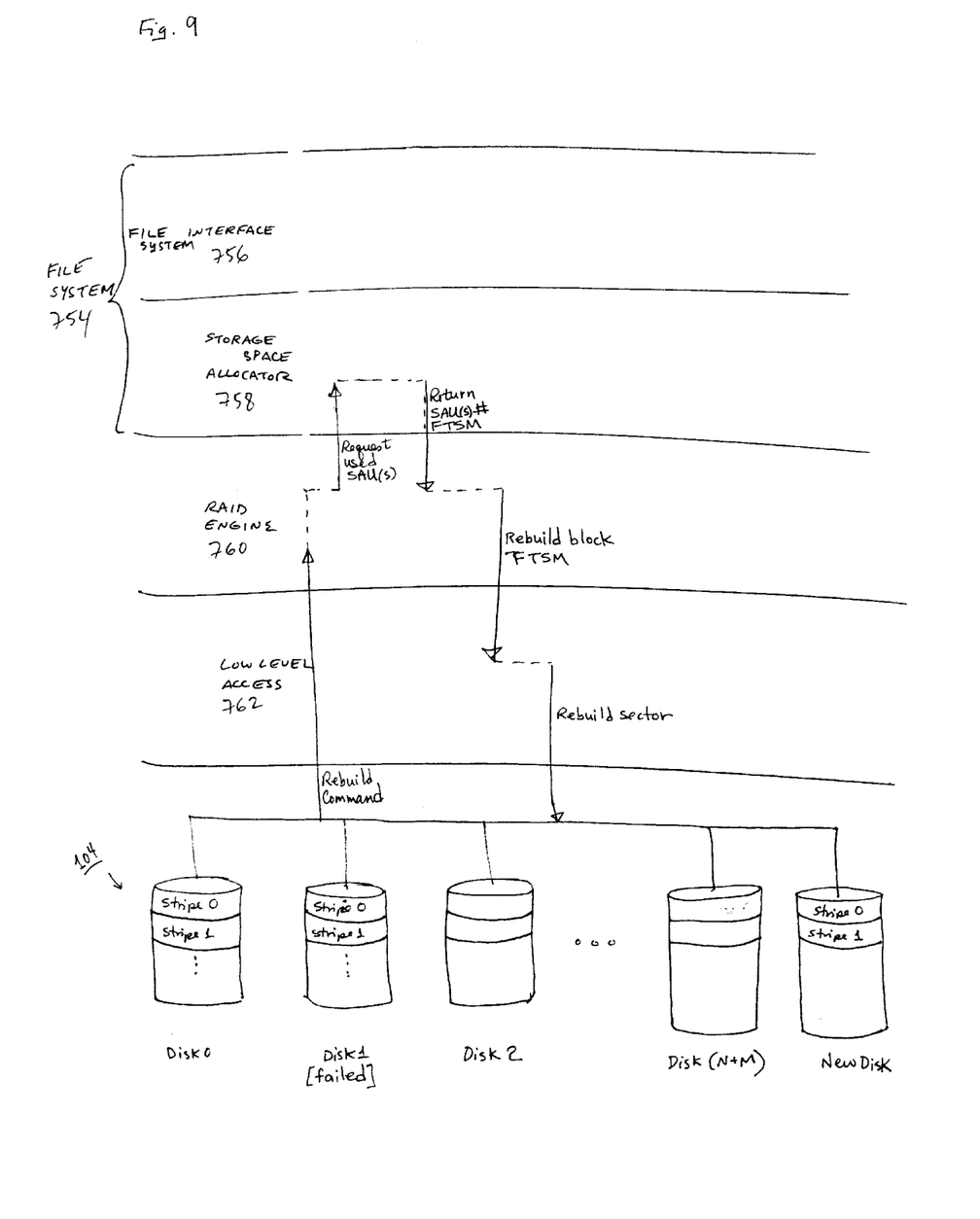
FIG. 9 depicts how a rebuild request is handled in an embodiment of the invention.

As an example of how the different layers of the file system and RAID engine interact, consider the layered architecture shown in FIG. 7. The layer to layer interaction that occurs when servicing a particular client request, in this case either a fsMediaWrite or fsWrite, is now described. The servicing of additional client requests fsMediaRead and fsRead, as well as a rebuild request, are shown in FIG. 8 and FIG. 9 to be described further below. The following generally describes the relevant functions of each layer together with exemplary implementations for each layer, followed by the servicing of exemplary client requests.

Starting with FIG. 7, it is shown that each layer provides services to the layer above it and requests actions from the layers below it. A client application 752 includes tasks that use a file system 754 to read/write media or non-media data. A video player engine as a software program is an example of a client of the file system.

The file system 754 maps file reads/writes to specific SAU accesses. The file system 754, and in particular the storage system allocator 758, is responsible for maintaining the allocation and assignment bitmaps of FIGS. 3–6 described above. The file system 754, and in particular a file system interface 756, provides the following primitives to its clients (besides the typical file system primitives like open( ), close( ), stat( ), etc.):

fsRead( ) and fswrite( ) to access files allocated as small blocks fsMediaRead( ) and fsMediaWrite( ) to access files allocated as stripes.

A RAID engine layer 760 provides the file system with primitives for reading and writing blocks of data to the disk array 104. This layer is also responsible for generating redundancy information for the different types of accesses, e.g. parity information for stripe accesses and data replication for small blocks. The RAID engine 760 also has a separate task that is responsible for the rebuilding of a failed disk. If one disk fails, the RAID engine is able to recover the data and essentially duplicate the used portions (SAUs) of the failed disk when the disk is replaced. The relevant primitives that the RAID engine 760 provides to the file system 754 include:

raidSmallBlockRead( ) and raidSmallBlockWrite( ) for small block access raidStripeRead( ) and raidStripeWrite( ) for stripe access The low level access layer 762 performs low level disk accesses to implement the higher level disk block operations requested by the RAID engine 760. This layer also prioritizes such low level accesses. The relevant primitives provided to the RAID engine include:

fcReadBlock( ) and fcWriteBlock( ) to access blocks of data

The low level access layer 762 accesses the physical layer which includes the disk array 104. The disks of the array 104 are connected to a bus and are accessed via a fiber channel driver, a small computer system interface (SCSI) controller, or other I/O controller found in conventional RAID systems.

Continuing to refer to FIG. 7, when the video player (client program 752) has accumulated its logical unit of data (for the video player this is a frame of compressed digital video), it will issue a fsMediaWrite( ). The file system interface 756 checks for unused SAUs (here, stripes) by querying the bitmaps and hash tables maintained by the storage space allocator 758. If there are unused stripes, the file system 754 through its client interface 756 accepts the data identified in the fsMediaWrite request, and checks to see if it has enough data to write a complete stripe (the stripe size is defined by the number of data disks N in the raidSet). If not, it returns and waits for the client 752 to write more data. Once enough data has been received to overlay a complete stripe, the file system interface 756 calls the RAID engine with raidStripeWrite( ). The RAID engine 760 computes the check information after determining the FTSM (here, RAID III) that is assigned to the stripe by accessing the appropriate table in the storage space allocator 758 (see FIG. 2). After the check information (e.g. XOR block) has been generated, the RAID engine 760 calls a fiber channel driver in the low level access layer 762 to write the data and check information to the disk array. Note that here, N fcWriteBlock( ) commands may be issued corresponding to N data disks.

FIG. 8 illustrates how read requests may be handled by the multilayer architecture having a tightly coupled RAID engine and file system. Operation begins with the client program 752 requesting a read, here fsMediaRead or fsRead. In response, the file system 754 identifies the SAUs that have been previously allocated to store the data being requested by the client. Note that the SAU may be one or more stripes or small stripes (in the case the client request is a fsMediaRead) or they may be small blocks (in the case where the client request is fsRead). In any one of these scenarios, the file system interface 756 after having obtained the SAU numbers calls the RAID engine 760 with a request to read the particular SAU numbers. Thereafter, the RAID engine 760 following conventional techniques reads blocks of data that correspond to the SAUs, and the data is returned, from one layer to the next, to the file system interface 756 and ultimately to the client program 752. Note that for read requests, it may not be necessary for the RAID engine 760 to identify the FTSM that was assigned to the SAU being read.

FIG. 9 shows the operations involved in rebuilding a failed disk. After the failed disk has been replaced with a new one, the RAID engine 760 queries the file system (in particular the storage space allocator 758) to find out what SAUs (e.g. stripes) need to be rebuilt. The file system returns a list of stripes to rebuild and the FTSM for each stripe, where the stripe allocation bit-map of FIG. 3 and the FTSM bit-map of FIG. 6 may be used to create this list. The RAID engine 760 then proceeds to rebuild each stripe in this list, applying the correct FTSM. Therefore, the RAID engine will rebuild only the stripes that the file system has indicated as being in use.

Figure 10:
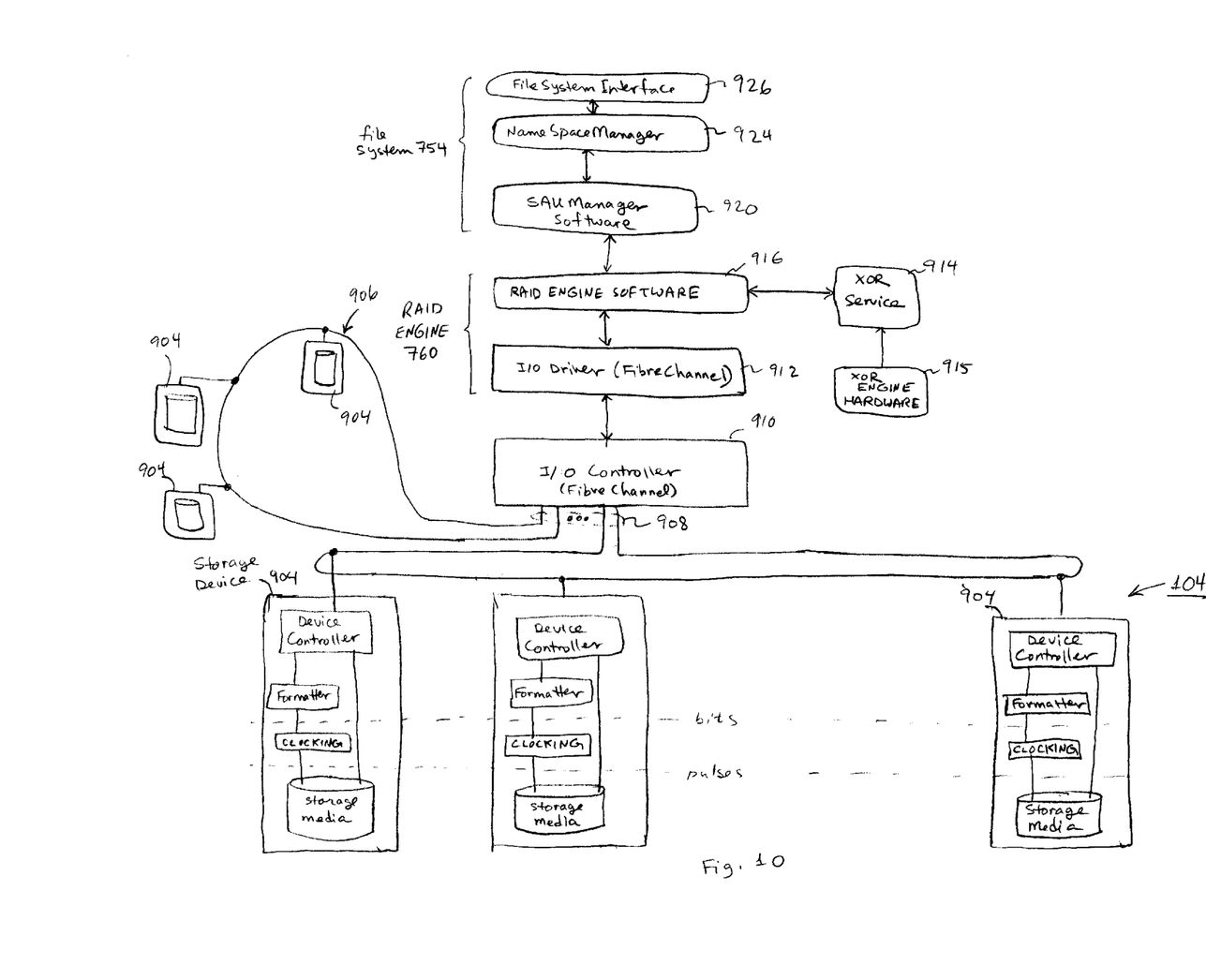
FIG. 10 shows a block diagram of a hardware/software implementation of an embodiment of the invention.
Figure 14:
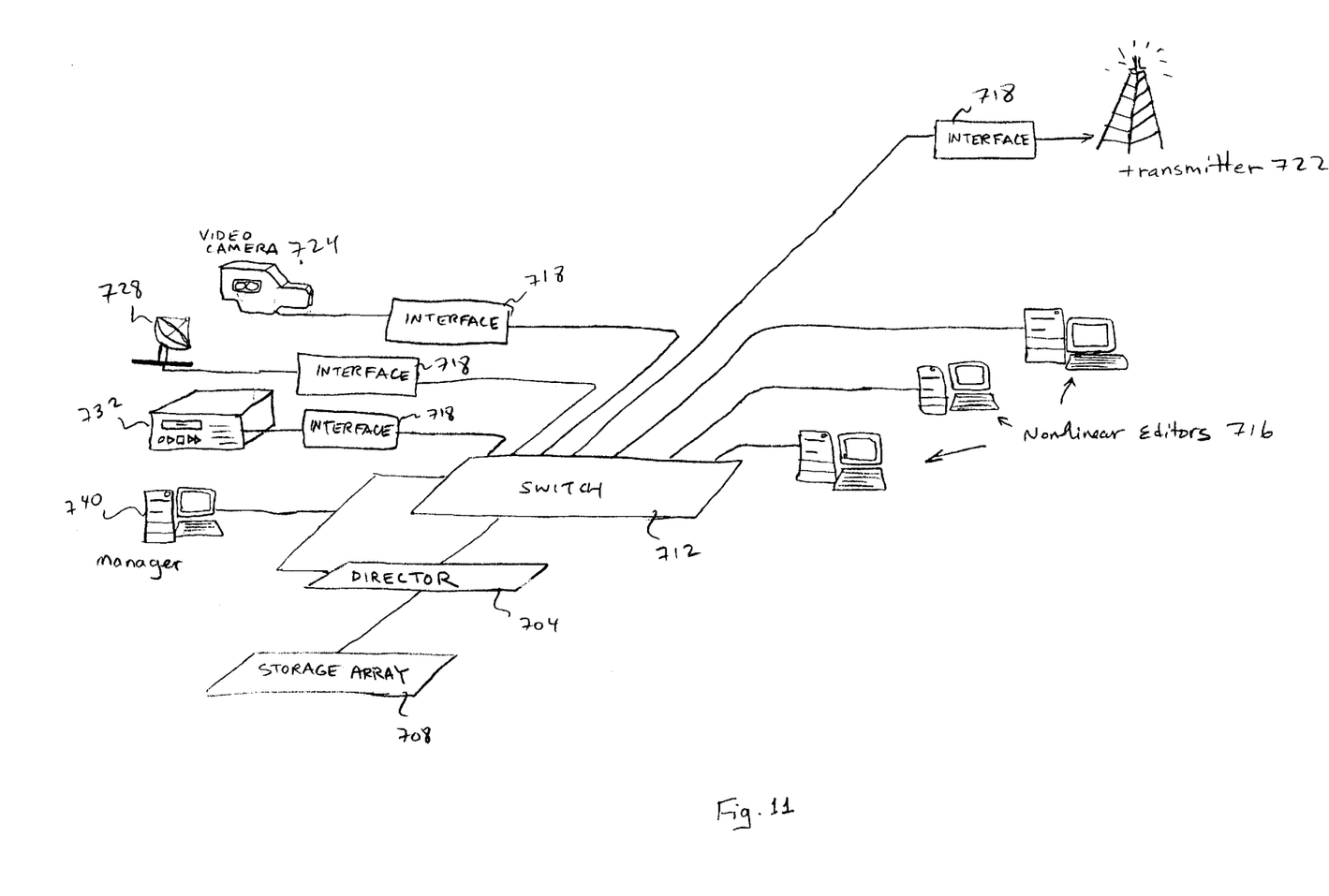

FIG. 10 illustrates a block diagram of the hardware and software that may be used to implement a tightly coupled storage system and file system, according to an embodiment of the invention. The disk array 104 features a number of storage devices 904 which may be individual rotating magnetic disk drive units in which the storage media includes a number of magnetic disk platters having sectors for storing and reading the data as electrical pulses. These storage devices 904 may all be connected to a serial bus (like Fibre Channel, FC) 908 having a number of loops 906. The Fibre Channel Loop is a physical serial bus used to connect disks to an I/O controller 910. It can be made of copper wire (for electrical connections) or plastic/glass fibers (for optical connections). Other data communication channels that are suitable for high speed access to each storage device 904 may alternatively be used. The I/O controller 910 (here, specific to Fibre Channel) serves as the interface between the bus 908 and the hardware/software combination which implements the RAID engine layer 760 and the file system layers. This controller is a hardware microcoded engine that implements a low level disk protocol and formats the data transferred to/from the individual disks. A Fibre Channel I/O driver 912 implements the access protocol to the disks. It issues read/write disk commands and passes the data to and from RAID engine software 916. The RAID engine software 916 is responsible for applying the FTSMs. For parity calculations, XOR service 914 is used including a separate processor with a specialized hardware XOR function. The SAU. manager software 920 maintains the allocation bit-maps and the FTSM bitmaps for the various SAUs, including large and small stripes and small blocks. The Name Space Manager 924 resolves a file name and maps it to a file descriptor. In the case of an existing file, the file descriptor contains a list of SAUs used by this file. When creating a new file, new SAUs are requested from the SAU manager 920 and allocated to the file.

It should be noted that the functionality of the file system 754 and the RAID engine 760 described above may be implemented by one or more processors (which may collectively be referred to as "a processor") executing instructions stored on a machine-readable medium. These instructions may be stored in one or more solid state memory chips (e.g. RAMs), non-volatile mass storage devices having built-in controllers (e.g. disk drives), or portable nonvolatile storage devices (e.g. optical compact disks).

FIG. 11 shows a particular application of the various embodiments of the tightly coupled secondary storage system and file system described above. What is shown is a collaborative production application which allows simultaneous access to all media files that are needed by production teams, whether producing a commercial, music video, or a newscast. Such a network includes a range of flexible components including a director 704 which is a storage array controller as well as a distributed file system. The director manages the recording and retrieval of data to and from a storage array 708. The storage array 708 may be the disk array 104 described above. A switch 712 being a content-aware packet switch is capable of connecting and routing data packets carrying various types of data including compressed video and commercial/program descriptor files. Nonlinear editors 716 may be directly connected to the switch 712. Devices without ports that are native to the network may connect via an interface 718. The interface 718 can encode digital video and audio in various different formats, where such may be compressed or uncompressed. Example of devices which may provide and receive data through a respective interface 718 include a video tape recorder (VTR) 732, a satellite receiver 728, a video camera 724, and a transmitter station 722. Finally, a manager 740 configures and manages the entire application and ensures that specific file types are routed to the correct interface, and also provides security and access rights to material on the network. Such an application may be the VIDEO AREA NETWORK infrastructure for the production and distribution of video provided by Omneon Video Networks, Inc.

The various embodiments of the tightly coupled secondary storage system and file system described here may be implemented in the application by configuring the director 704 to implement the file system and RAID engine of an embodiment of the invention described above. In that case, the director 704 and the storage area 708 act as a node in the network shown in FIG. 11, where client requests may originate from any one of the non-linear editors 716 deemed to be separate nodes in the network.

To summarize, various embodiments of the invention have been described that are directed to a tightly coupled secondary storage system and file system. In the foregoing specification, the invention has been described with reference to specific exemplary embodiments thereof. It will, however, be evident that various modifications and changes may be made thereto without departing from the broader spirit and scope of the invention as set forth in the appended claims. For instance, the numerical sizes of the raidSet, stripe, and small stripe mentioned above are merely exemplary, used to enable an easier understanding of the invention. Also, the particular embodiment that uses the combination of Level I and Level III RAID for the different FTSMs may alternatively be configured with SAUs being assigned additional different RAID FTSMs (there are currently seven different levels of RAID). Another alternative would be to use a pair of FTSMs other than Level I and Level III RAID. In addition, although the RAID and its individual magnetic disk drives having built-in controllers serve as a currently preferred hardware platform for the secondary storage system, it is expected that other types of secondary storage systems, e.g. ones that do not use rotating magnetic disk drives, such as read/write optical storage disks (but not slower systems such as magnetic or optical tape drives, punch cards, or paper tape), may also benefit from the invention's tightly coupled secondary storage and file system described above. The specification and drawings are, accordingly, to be regarded in an illustrative rather than a restrictive sense.

What is claimed is:

1. A system comprising:
a mass storage engine to access a storage allocation unit (SAU) that overlays a plurality of non-volatile storage devices of the system; and
a file system to receive a request to write data from a client program, the file system having a storage space allocator that can identify an unused SAU to which said data can be written, the file system to request the mass storage engine to write said data to the identified, unused SAU,
wherein the mass storage engine is to request the storage space allocator to identify which of a plurality of different, predefined fault tolerant storage methodologies (FTSMs) is assigned to the identified, unused SAU, before writing said data to the identified, unused SAU in accordance with the assigned FTSM.

2. The system of claim 1 wherein the plurality of different predefined FTSMs include two different ones of RAID Levels I–VII.

3. The system of claim 2 in combination with other nodes of a computer network, of which the system is a node, the computer network being a collaborative production application in which media and non-media files, stored in the system, can be accessed by video production teams.

4. A system comprising:
a file system that supports the storage and retrieval of media and non-media files, the media files being larger than the non-media files, wherein access to a media file involves one of (1) a sequence of storage allocation unit (SAU) writes to record said media file and (2) a sequence of SAU reads to play back said media file, access to non-media files involves one of (1) relatively random SAU writes and (2) relatively random SAU reads, and a different fault tolerant storage methodology (FTSM) and SAU size is assigned by the file system for first SAUs that are to store a media file than for second SAUs that are to store a non-media file; and
a mass storage engine to access the first and second SAUs, each of which overlays the same plurality of non-volatile storage devices of the system, to store and retrieve said media and non-media files, under control of the file system, wherein the mass storage engine is to request that the file system identify which of a plurality of different, FTSMs predefined in the system is assigned to an SAU when the mass storage engine is to write to and read from said SAU.

5. The system of claim 4 wherein the plurality of different predefined FTSMs include two different ones of RAID Levels I–VII.

6. The system of claim 4 wherein the media files are compressed video files and the non-media files are one of meta-data files and text files, wherein the meta-data and text files contain descriptions of the video files.

7. An apparatus comprising:
a machine-readable medium having data stored therein which when accessed by a processor cause a file system to (1) divide a logical storage space representing a storage area in a redundant set of non-volatile storage devices into first and second types of storage units, the first type being larger than the second type, (2) assign first and second different fault tolerant storage methodologies (FTSMs) to access data in the first and second types of storage units, respectively, (3) allow storage of a video file in said redundant set by allocating, for said video file, storage units of the first type and not the second type, (4) allow storage of a metadata file in said redundant set by allocating, for said metadata file, storage units of the second type and not the first type, and (5) provide a redundant set storage engine with information as to which FTSM to use for a given storage unit when rebuilding a failed one of said non-volatile storage devices.

8. The apparatus of claim 7 wherein the medium has further data which cause the file system to divide the logical storage space into a third type of storage unit being smaller than the first type and larger than the second type, allow storage of one of a compressed video and compressed audio file in said redundant set by allocating, for said compressed video or audio file, storage units of the third type and not the first and second types.

9. The apparatus of claim 8 wherein the medium has further data which cause the file system to assign a third FTSM to access data in the third type of storage units.

10. The apparatus of claim 7 wherein the data stored in said medium are such that the first FTSM is RAID Level III and the second FTSM is RAID Level I.

11. The apparatus of claim 7 wherein the medium has further data which cause the file system to communicate with an application program over a computer network in which the redundant set is part of a storage node and the application program is running in a host node.

12. The apparatus of claim 7 wherein the medium has further data which cause the file system to communicate with an application program over a computer network that forms a collaborative production application in which the redundant set is part of a storage node that stores media files and the application program is to be used by a member of a team for producing one of a commercial, a music video, and a newscast.

13. The apparatus of claim 11 wherein the medium has further data which cause the file system to provide the redundant set storage engine with information as to which storage units are in use, so that only those storage units that are in use and that overlay a failed one of said non-volatile storage devices need be rebuilt.

14. An apparatus comprising:
a machine-readable medium having data stored therein which when accessed by a processor cause a file system to (1) allocate a logical storage space representing a storage area in a redundant array of non-volatile storage devices in storage units of first and second types, (2) assign first and second different fault tolerant storage methodologies (FTSMs) to access data in the first and second types of storage units, respectively, (3) allow storage of a media file in said redundant array by allocating, for said media file, storage units of the first type and not the second type, (4) allow storage in the redundant array of a metadata file that describes said media file, by allocating, for said metadata file, storage units of the second type and not the first type, and (5) provide a redundant array storage engine with information as to which parts of the logical storage space are in use so that only those parts that are in use and that overlay a failed one of said non-volatile storage devices need be rebuilt.

15. The apparatus of claim 14 wherein the medium has further data which cause the file system to provide the redundant array storage engine with information as to which FTSM to use for rebuilding parts of the logical storage space that overlay the failed storage device.

16. The apparatus of claim 15 wherein the medium has further data which cause the file system to communicate with an application program over a computer network in which the redundant array is part of a storage node and the application program is running in a host node.

17. The apparatus of claim 15 wherein the medium has further data which cause the file system to communicate with an application program over a computer network that forms a collaborative production application in which the redundant array is part of a storage node that stores media files and the application program is running in a host node that can be used by a member of a team that is producing one of a commercial, a music video, and a newscast.

* * * * *